Sept. 10, 1946.  J. E. GUDMUNDSON  2,407,416
LEVEL OR LIKE SURVEYING INSTRUMENT
Filed April 12, 1944
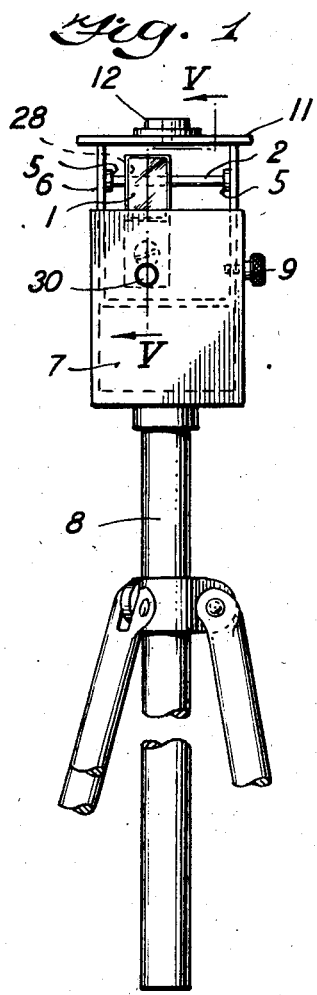
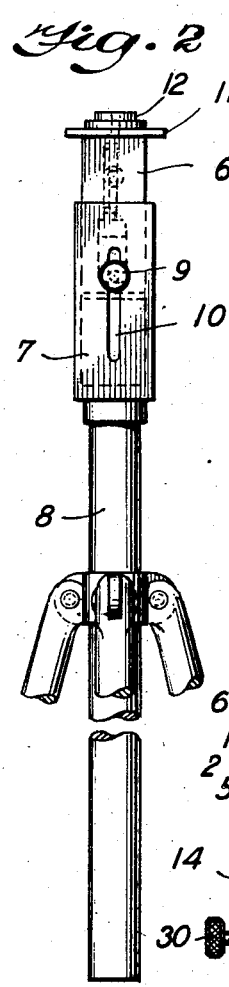
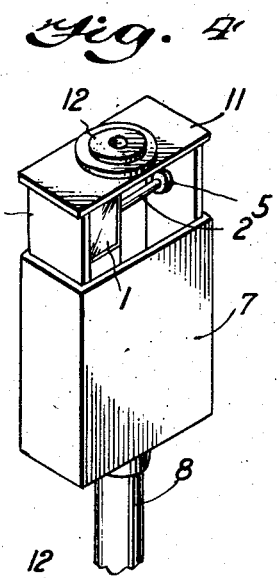
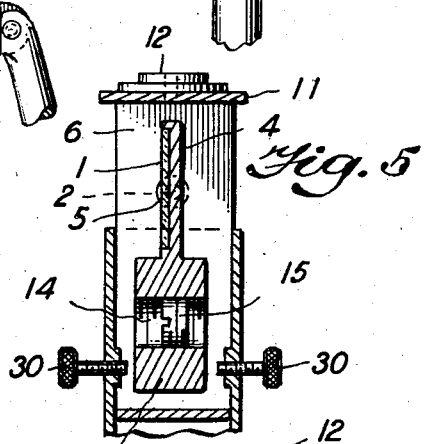
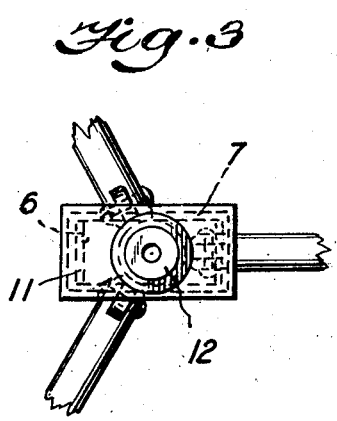
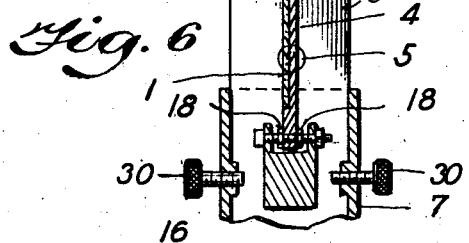
INVENTOR
JOHN E. GUDMUNDSON,
BY
ATTORNEY Patented Sept. 10, 1946

2,407,416

UNITED STATES PATENT OFFICE 2,407,416

LEVEL OR LIKE SURVEYING INSTRUMENT

John Ejnar Gudmundson, Brakpan, Transvaal, Union of South Africa

Application April 12, 1944, Serial No. 530,710
In the Union of South Africa April 13, 1943

7 Claims. (Cl. 88—2.2)

This invention relates to surveying instruments of the type by means of which levels, grades and the like may be obtained. The object is to provide a simply constructed instrument capable of giving levels, grades or the like without any calculations being necessary and requiring no particular skill to use it.

According to the invention the instrument consists essentially of a flat weighted mirror mounted on a trunnion pin for pivoting movement about a horizontal axis pendulum fashion so that it tends at all times to hang with its face in a truly vertical plane, which mirror has a horizontal datum line marked on its face in line with the top side of said trunnion pin, the arrangement being such that when the image of the pupil of an observer's eye is seen bisected by said datum line the line of sight is truly horizontal so that by sighting past the mirror with said eye over the top side of that portion of the trunnion pin extending one side of the mirror, a figure or marking on a distantly erected levelling staff indicated by the line of the top side of the trunnion pin, is at the same level as said top side and consequently is at the same level as the aforesaid datum line.

More particularly the said trunnion pin with the mirror depending therefrom is mounted within an open-sided substantially rectangular mirror frame, between bearings provided in the two opposite vertical members thereof so that the mirror swings freely within said frame. Attached to the lower end of the mirror is a weight which is provided with means for adjusting its effective centre of gravity with respect to the pivoting axis of the mirror, for purposes of adjusting the setting of the mirror when necessary, so that its face tends to be kept in a truly vertical plane. Once the mirror has been thus set, the weight should only require to be adjusted at infrequent intervals depending upon the usage to which the instrument is subjected. For convenience the instrument is arranged to be supported on a suitable staff or tripod at a convenient height above the ground. In the preferred construction the said frame is slidably located within a box-like casing from which it is arranged to be partially withdrawn for use in an upward direction after the fashion of a match box from its casing. When not in use the frame is pushed into the casing so that the mirror and its associated parts are protected against damage. Suitable stop means are provided to limit the extent of withdrawal as also the closed position of the frame with respect to the casing which is arranged to be attached or attachable to the top end of a supporting staff tripod or the like by its bottom end. To facilitate the setting up of the instrument in a vertical position, it is provided with a circular level preferably located on the top side of the aforementioned mirror frame.

More particularly, the mirror frame is provided with suitable bearings on the inside surfaces of the vertical members thereof, between which bearings the trunnion pin is rotatably journalled. The mirror is preferably mounted on a metal backing plate, which latter is fixed to the said trunnion pin intermediately of its top and bottom ends. A suitable weight is adjustably suspended from the lower end of said backing plate, or has means for adjusting its centre of gravity with respect to the pivoting axis of the mirror.

The weight may be of any suitable shape and in one form is provided with two upwardly projecting suspension members provided with a screw passing through them, which screw is adapted to pass through a hole in the lower end of the said backing plate. Said screw is provided with two nuts on its intermediate portion between which the mirror backing plate is located, so that by adjustment of said nuts the position of the weight may be adjusted to such a position relative to the mirror, that the mirror will be located in a true vertical plane. According to the preferred construction the weight is permanently attached to or is formed integrally with the aforesaid backing plate and a short grub screw co-acting in a tapped hole passing through said weight in a direction at right angles to the axis of the trunnion pin, provides the adjustable means for setting the mirror. The horizontal line across the face of the mirror may be painted, etched or otherwise marked on the mirror.

The instrument above described may be used with various types of levelling staffs. A specially designed levelling staff which is preferably used in conjunction with the above described instrument, is described and claimed in co-pending application Ser. No. 597,391 filed on June 4, 1945. The levelling staff comprises three parts which are telescopically associated and adjustably positionable with respect to one another. The parts consist of a middle part graduated from the top downwardly, a bottom part graduated from a middle zero line both upwardly and downwardly, and a top part graduated from the top downwardly.

In setting the mirror truly vertical the instrument and levelling staff are erected vertically at two points of the same elevation some distance apart.

The zero line of the bottom part of the staff is clamped to coincide with the lower edge of the middle part. The datum line on the mirror then being at the same elevation as the top of the middle part, the adjusting screw is now manipulated until the datum line across the mirror bisects the image of the pupil of the observer's eye when the top side of the horizontal trunnion pin coincides with the top of the middle part of the staff.

In use, the instrument should be held vertically and one eye should be seen reflected in the mirror with the pupil bisected by the horizontal datum line. The mirror being vertical, will reflect the light entering the eye at right angles to the mirror, thus making the line of sight horizontal. On sighting past the mirror over the top side of the trunnion pin, the figure indicated directly in line with the top side of the trunnion pin will be at the same level as said top side.

To enable the invention to be more clearly understood and carried into practice, reference is now made to the accompanying drawing, in which like reference characters denote like parts throughout the several views.

In the drawing:

Fig. 1 is a front elevation of an instrument constructed according to the invention, shown in its open or operative position mounted on a tripod.

Fig. 2 is a side elevation taken on Fig. 1.

Fig. 3 is a plan view taken on Fig. 1.

Fig. 4 is a perspective view of the instrument as shown in Fig. 1.

Fig. 5 is a fragmentary sectional end view taken on line V—V of Fig. 1.

Fig. 6 is a similar view but showing an alternative arrangement for adjusting the weight.

Referring to the drawing, reference 1 denotes the mirror rigidly attached by a backing plate 4 to the trunnion pin 2 mounted between end bearings 5, provided on the insides of the vertical members of the open-sided rectangular mirror frame 6 which is slidably located within the rectangular box-like casing 7, adapted to be detachably mounted in an upright position on the centre leg 8 of the tripod as shown. The extent to which the frame 6 is permitted to be drawn out of its casing 7, is limited by the screw 9 which co-acts with a slot 10 in an end wall of the casing 7. This stop screw 9 also provides the means for clamping said frame 6 both in its open and closed position since it engages in a tapped hole in the frame 6. In the closed position the top plate 11 forms a dust-tight closure for the top open end of the casing 7. To enable the instrument to be set up truly vertical, a circular level 12 is fixed to the said top plate 11.

In the preferred construction as shown in Fig. 5, the mirror 1 is held in a truly vertical plane by the weight 13 which has a tapped hole 14 passing through it in a direction at right angles to the axis of the trunnion pin 2. Co-acting with the screw threads in this hole 14 is the short grub screw 15 constituting a movable weight which, by the use of a screwdriver may be adjusted in the hole 14 for purposes of setting the mirror 1 in a truly vertical plane. In the modified construction shown in Fig. 6, a weight 16 is suspended from the backing plate 4 by means of a small screw or bolt 17. The bottom end of the backing plate 4 is located between two nuts 18 by means of which the relative position of the weight 16 with respect to the mirror 1, may be adjusted to secure true verticality of the mirror.

To set the mirror 1, a levelling staff is set up some distance away from the instrument on a point at the same elevation as the point on which the instrument is erected. The mirror 1 is now adjusted by the grub screw 15 until the datum line 28 bisects the image of the pupil of the observer's eye when the top side of the trunnion pin 2 coincides with a datum line on the levelling staff. With this setting the line of sight will always be horizontal and readings given by the staff will then indicate relative positions of the points at which the staff is held.

According to a modification, the instrument may be used as a true gradienter with the levelling staff held at any distance from it. For this purpose two adjusting screws 30 projecting through the casing 7, and on opposite sides coacting with the weight 13 or 16, are provided to enable the mirror 1 to be set out of its true vertical plane.

What I claim is:

1. A surveying instrument of the character described, which comprises a supporting staff, an upwardly open frame housing mounted on said staff, an open-sided mirror frame slidably disposed in said housing and upwardly withdrawable therefrom, means for determining the extent of relative movement between said frame and housing and for retaining the latter against relative movement, a trunnion pin oscillatably journaled in said frame, a mirror secured to said trunnion pin intermediate the ends thereof, said mirror being provided on its face with a horizontal datum line in line with the top of said trunnion pin, and means for adjusting the effective center of gravity of said mirror with respect to the axis of said trunnion pin for maintaining the mirror face in a truly vertical plane.

2. A surveying instrument of the character described, which comprises a supporting staff, an upwardly open frame housing mounted on said staff, an open-sided mirror frame slidably disposed in said housing and upwardly withdrawable therefrom, said frame comprising opposite vertical members, means for determining the extent of relative movement between said frame and housing and for retaining the latter against relative movement, a trunnion pin oscillatably journaled in the said opposite vertical members of said frame, a mirror secured to said trunnion pin intermediate the ends thereof, said mirror being provided on its face with a horizontal datum line in line with the top of said trunnion pin, and means for adjusting the effective center of gravity of said mirror with respect to the axis of said trunnion pin for maintaining the mirror face in a truly vertical plane, said last-named means comprising a weight attached to the lower end of said mirror and having a portion at least which is adjustable relative to said mirror.

3. A surveying instrument of the character described, which comprises a supporting staff, an upwardly open frame housing mounted on said staff, an open-sided mirror frame slidably disposed in said housing and upwardly withdrawable therefrom, said frame comprising opposite vertical members and a top side, means for determining the extent of relative movement between said frame and housing and for retaining the latter against relative movement, a trunnion pin oscillatably journaled in said frame, a mirror secured to said trunnion pin intermediate the ends thereof, said mirror being provided on its face with a horizontal datum line in line with the top of said trunnion pin, the said top side constituting a closure means for the upwardly open end of said housing, and means for adjusting the effective center of gravity of said mirror with respect to the axis of said trunnion pin for maintaining the mirror face in a truly vertical plane.

4. A surveying instrument of the character described, which comprises a supporting staff, an upwardly open frame housing mounted on said staff, an open-sided mirror frame slidably disposed in said housing and upwardly withdrawable therefrom, means for determining the extent of relative movement between said frame and housing and for retaining the latter against relative movement, a trunnion pin oscillatably journaled in said frame, a mirror backing plate secured to said trunnion pin intermediate the ends thereof, a mirror mounted on said backing plate, said mirror being provided on its face with a horizontal datum line in line with the top of said trunnion pin, and means for adjusting the effective center of gravity of said mirror with respect to the axis of said trunnion pin for maintaining the mirror face in a truly vertical plane.

5. The relationship of parts according to claim 4, said last-named adjusting means comprising a weight integrally associated with said mirror backing plate in depending relation thereto, said weight being provided with a tapped bore extending therethrough in a direction at right angles to the axis of said trunnion pin, and a short grub screw movably positioned in said bore and in threaded engagement therewith.

6. The relationship of parts according to claim 4, said last-named adjusting means comprising a weight depending from said backing plate and means for displacing said weight relative to said backing plate in a direction at right angles to the axis of said trunnion pin.

7. The relationship of parts according to claim 4, said adjusting means comprising a weight depending from said backing plate, and an adjusting means projecting through said housing on opposite sides thereof and engageable with said weight to enable said mirror to be tilted and set out of its true vertical plane.

JOHN EJNAR GUDMUNDSON.